United States Patent
Buschjohann et al.

(10) Patent No.: US 10,279,838 B2
(45) Date of Patent: May 7, 2019

(54) WHEEL MOUNT

(71) Applicant: KSM Castings Group GmbH, Hildesheim (DE)

(72) Inventors: Thomas Buschjohann, Nordstemmen (DE); Stefan Geisler, Sarstedt (DE); Klaus Greven, Hildesheim (DE); Aribert Simmack, Harsum (DE); Heiko Kauert, Bernau (DE); Jan Roemhild, Bernau (DE)

(73) Assignee: KSM Castings Group GmbH, Hildesheim (DE)

( * ) Notice: Subject to any disclaimer, the term of this patent is extended or adjusted under 35 U.S.C. 154(b) by 0 days.

(21) Appl. No.: 15/553,597

(22) PCT Filed: Feb. 23, 2016

(86) PCT No.: PCT/DE2016/100079
§ 371 (c)(1),
(2) Date: Aug. 25, 2017

(87) PCT Pub. No.: WO2016/134699
PCT Pub. Date: Sep. 1, 2016

(65) Prior Publication Data
US 2018/0037258 A1   Feb. 8, 2018

(30) Foreign Application Priority Data

Feb. 27, 2015   (DE) .................. 10 2015 102 887

(51) Int. Cl.
*B60G 7/00*   (2006.01)
*B62D 7/18*   (2006.01)

(52) U.S. Cl.
CPC ............... *B62D 7/18* (2013.01); *B60G 7/008* (2013.01); *B60G 2200/156* (2013.01);
(Continued)

(58) Field of Classification Search
CPC .................................. B62D 7/18; B62G 7/008
See application file for complete search history.

(56) References Cited

U.S. PATENT DOCUMENTS 4,941,677 A    7/1990  Matsumoto et al.
5,257,801 A *  11/1993 Matsuzawa .............. B60G 3/26
                                         280/124.138
(Continued)

FOREIGN PATENT DOCUMENTS

DE         203 19 147 U1    4/2004
DE    20 2005 016765 U1    2/2006
(Continued)

OTHER PUBLICATIONS

International Search Report of PCT/DE2016/100079, dated Jun. 27, 2016.
(Continued)

*Primary Examiner* — Nicole T Verley
(74) *Attorney, Agent, or Firm* — Collard & Roe, P.C.

(57) ABSTRACT

A wheel mount, particularly for the front axle of a motor vehicle, has a basic body that has at least individual ones of the following accommodations or recesses: for accommodation of a kingpin for a wheel bearing, for connection of a brake caliper, for mounting of an upper wishbone fork, for mounting of an upper semi-trailing arm, for mounting of a tie rod, for mounting of a lower spring link, for mounting of a further lower wishbone, for positioning of a sensor, particularly an rpm sensor, for attachment of a sensor, particularly an rpm sensor, wherein the wheel mount is produced as a die-cast component made in one piece with these accommodations or recesses and connecting them with one another, preferably from light metal.

35 Claims, 8 Drawing Sheets

Figure 1:
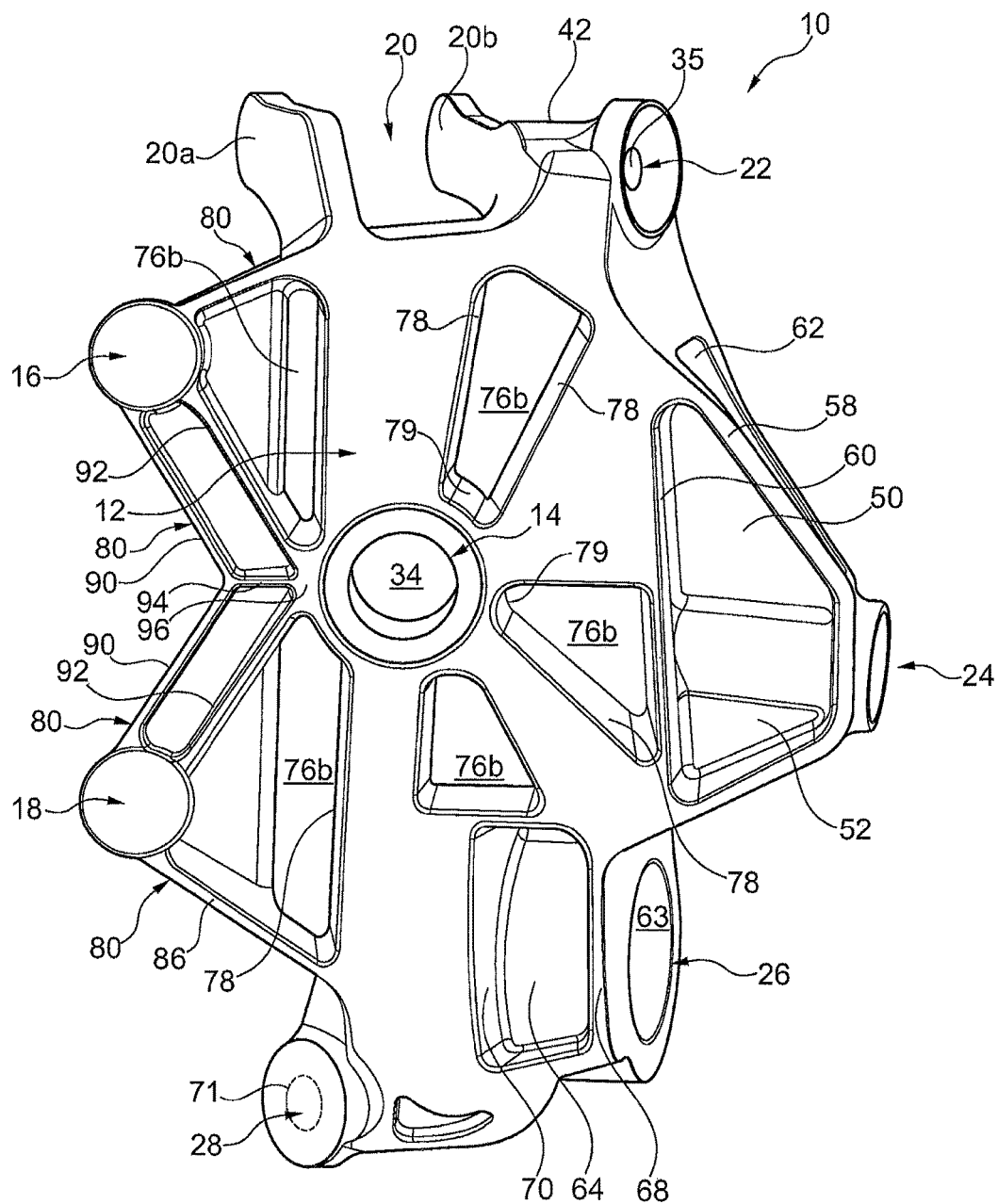

(52) U.S. Cl.
CPC .... *B60G 2204/11* (2013.01); *B60G 2204/115* (2013.01); *B60G 2204/1484* (2013.01); *B60G 2206/50* (2013.01); *B60G 2206/7102* (2013.01); *B60G 2206/7103* (2013.01); *B60G 2206/8101* (2013.01); *B60G 2400/208* (2013.01); *B60Y 2400/3032* (2013.01)

(56) References Cited

U.S. PATENT DOCUMENTS

| | | | | |
|---|---|---|---|---|
| 5,697,633 | A * | 12/1997 | Lee | B60G 3/26 280/124.128 |
| 7,104,559 | B2 * | 9/2006 | Shimosato | B23B 51/105 280/93.512 |
| 7,117,599 | B2 * | 10/2006 | Sadanowicz | B21D 53/26 29/894.361 |
| 7,537,071 | B2 * | 5/2009 | Kamiya | B60G 3/20 180/298 |
| 8,297,632 | B2 * | 10/2012 | Webster | B22D 18/04 280/93.512 |
| 8,328,212 | B1 * | 12/2012 | Dundon | B60G 3/20 280/124.128 |
| 9,328,784 | B2 * | 5/2016 | Badino | F16D 55/22655 |
| 9,731,572 | B2 * | 8/2017 | Tamura | B60K 7/0007 |
| 9,751,559 | B2 * | 9/2017 | Maruyama | B62D 7/18 |
| 10,011,164 | B2 * | 7/2018 | Tamura | B60G 3/20 |
| 2002/0050694 | A1 * | 5/2002 | Mikasa | B60G 3/06 280/86.758 |
| 2003/0107201 | A1 * | 6/2003 | Chun | B60G 3/20 280/124.135 |
| 2006/0033301 | A1 | 2/2006 | Roos et al. | |
| 2016/0223024 | A1 * | 8/2016 | Tanahashi | B60B 27/00 |
| 2017/0210418 | A1 * | 7/2017 | Sakuma | B62D 7/18 |
| 2018/0057051 | A1 * | 3/2018 | Passero | B62D 15/023 |
| 2018/0066720 | A1 * | 3/2018 | Dilworth | B62D 7/18 |
| 2018/0086377 | A1 * | 3/2018 | Kleemann | B62D 7/18 |
| 2018/0215220 | A1 * | 8/2018 | Mailhot | B60G 7/001 |

FOREIGN PATENT DOCUMENTS

| | | | | |
|---|---|---|---|---|
| DE | 199 23 694 B4 | 4/2010 | | |
| DE | 10 2010 023231 A1 | 6/2011 | | |
| DE | 10 2014 200 076 A1 | 7/2015 | | |
| DE | 102014205384 A1 * | 9/2015 | | B62D 7/18 |
| DE | 102017102102 A1 * | 8/2017 | | B62D 7/18 |
| DE | 102016122677 A1 * | 1/2018 | | B60G 3/00 |
| EP | 1 055 584 A2 | 11/2000 | | |
| EP | 1 597 132 B1 | 8/2008 | | |
| EP | 2 163 411 A1 | 3/2010 | | |
| JP | 6286910 B2 * | 3/2018 | | |
| WO | 2013/153308 A1 | 10/2013 | | |
| WO | WO-2016029606 A1 * | 3/2016 | | B62D 7/18 |

OTHER PUBLICATIONS

English translation of International Preliminary Report on Patentability and Written Opinion of International Searching Authority in PCT/DE2016/100079, dated Sep. 5, 2017.

* cited by examiner

WHEEL MOUNT

CROSS REFERENCE TO RELATED APPLICATIONS

This application is the National Stage of PCT/DE2016/100079 filed on Feb. 23, 2016, which claims priority under 35 U.S.C. § 119 of German Application No. 10 2015 102 887.5 filed on Feb. 27, 2015, the disclosure of which is incorporated by reference. The international application under PCT article 21(2) was not published in English.

The invention relates to a wheel mount, particularly for the front axle of a motor vehicle.

Known wheel mounts are components cast in one piece or one part, or forged in one piece or one part, from steel or aluminum materials, wherein the functional surfaces are usually finished by cutting them.

The invention is based on the task of optimizing a wheel mount cast in one piece, particularly for the front axle of a motor vehicle, with regard to at least individual functions or requirements as stated below. The invention is particularly based on the task of making available a wheel mount for a driven axle, particularly for a front axle, which wheel mount is to be optimized accordingly. In this regard, the wheel mount according to the invention is supposed to absorb and pass on all wheel forces and moments in operationally reliable manner, and to bridge the construction space between kinematics points and wheel bearing.

The wheel mount according to the invention is furthermore supposed to contribute to further reduction of unsprung masses and to demonstrate great rigidity.

Furthermore the wheel mount according to the invention is supposed to demonstrate a ductility and a geometry such that it permits sufficient deformation of the wheel mount before failure.

The wheel mount according to the invention is supposed to be non-sensitive to corrosion, demonstrate good processability and, in particular, reduced weight with simultaneous great strength, and be cost-advantageous to produce.

In particular, the invention is based on the task of developing a geometry for a wheel mount that increases the system rigidity as a whole and thereby further improves wheel guidance.

This task is accomplished, according to the invention, by means of a wheel mount, particularly for the front axle of a motor vehicle, having a basic body that has at least individual ones of the accommodations or recesses listed below:
- for accommodation of a kingpin for a wheel bearing,
- for connection of a brake caliper,
- for mounting of an upper wishbone fork,
- for mounting of an upper semi-trailing arm,
- for mounting of a tie rod,
- for mounting of a lower spring link,
- for mounting of a further lower wishbone,
- for positioning of a sensor, particularly an rpm sensor,
- for attachment of a sensor, particularly an rpm sensor, wherein the wheel mount is produced as a die-cast component made in one piece with these accommodations or recesses and connecting them with one another, preferably from light metal.

It has been shown that such a wheel mount demonstrates significantly lesser weight, as a die-cast component, than a correspondingly counter-pressure-cast (CPC) wheel mount. Proceeding from a counter-pressure-cast wheel mount that has a weight of approximately 3.3 kg, a weight saving of more than 1 kg can be achieved by means of the wheel mount according to the invention, wherein the wheel mount according to the invention, produced using die-casting, meets the same requirements as those set for a counter-pressure-cast wheel mount.

It can be advantageous if the recess for accommodation of the kingpin, as the central element in the basic body, has a cylindrical passage opening with an inside diameter that preferably remains the same over its length, which opening is essentially oriented horizontally.

It can be advantageous if the accommodation for mounting of the upper wishbone fork is disposed in the upper end region of the wheel mount.

It can be advantageous if the accommodation for mounting of the upper wishbone fork is configured approximately in U shape, with two accommodation elements that are spaced apart from one another, viewed in the direction of travel, to surround and hold the upper wishbone fork.

It can be practical if the accommodation elements are oriented at a slant in the direction of travel FR, with reference to the center longitudinal axis of the cylindrical passage opening, more or less as outriggers that project away from the back side of the wheel mount.

It can be advantageous if the accommodation elements are configured and oriented, with a view onto the upper face side of the wheel mount, in such a manner that a mold division plane of the die-cast wheel mount is disposed between the accommodation elements, parallel to the unmolding direction. Such a configuration permits elimination of a slider in the region of the said accommodation for mounting of the upper wishbone fork.

It can be advantageous if, when looking at the upper face side of the wheel mount, a mold division plane runs between the free end of the rear accommodation element, viewed in the direction of travel, and the non-free end of the front accommodation element, viewed in the direction of travel.

It can be advantageous if the accommodation for mounting of the upper semi-trailing arm is disposed in the upper end region of the wheel mount.

It can be advantageous if the accommodation for mounting of the upper semi-trailing arm is preferably configured in sleeve shape, with a cylindrical passage bore, wherein the entry region of the passage bore preferably has a reinforced edge region.

It can be advantageous if at least a part of the wall of the accommodation for mounting of the upper semi-trailing arm makes a transition into the wall of the rear accommodation element, viewed in the direction of travel, of the accommodation for mounting of the upper wishbone fork, preferably contributes to forming a part of the wall of the rear accommodation element, viewed in the direction of travel, and vice versa.

It can be advantageous if a reinforcement rib runs on the outside of the sleeve-shaped accommodation for mounting of the upper semi-trailing arm and makes a transition into the wall of the rear accommodation element, viewed in the direction of travel, of the accommodation for mounting of the upper wishbone fork.

It can be advantageous if a cutout introduced on one side is provided on the back side of the wheel mount, below the sleeve-shaped accommodation and directly following the sleeve-shaped accommodation for mounting of the upper semi-trailing arm.

It can be advantageous if the cutout that follows the sleeve-shaped accommodation for mounting of an upper semi-trailing arm is delimited, at least in part, by a reinforcement wall and/or reinforcement rib.

It can be advantageous if the accommodation for mounting of the tie rod is disposed in the rear end region, viewed in the direction of travel, preferably at about half the height of the wheel mount.

It can be advantageous if the accommodation for mounting of the tie rod is preferably configured in sleeve shape, with a cylindrical passage bore, wherein the cylindrical passage bore is preferably oriented in the direction of the recess for accommodation of the kingpin and/or wherein the entry region of the passage bore preferably has a reinforced edge region.

It can be advantageous if at least one cutout introduced on one side is provided on the back side and/or the front side of the wheel mount, along the one and/or the other side, in other words next to the sleeve-shaped accommodation for mounting of the tie rod.

It can be advantageous if the cutouts introduced longitudinally next to the sleeve-shaped accommodation for mounting of the tie rod are surrounded, each individually and/or as combined cutouts, at least in part, by at least one reinforcement rib or bead and/or wall or at least one reinforcement belt or ridge.

It can be advantageous if at least one hollowed-out region, recess or cutout is provided in the rear face side of the wheel mount, viewed in the direction of travel.

It can be advantageous if the hollowed-out region, recess or cutout provided in the rear face side of the wheel mount, viewed in the direction of travel, is introduced on one side during die-casting, using a movable core and/or contoured part or slider.

It can be advantageous if the hollowed-out region, recess or cutout provided in the rear face side of the wheel mount, viewed in the direction of travel, is disposed in a region between the accommodation for mounting of the upper semi-trailing arm and the accommodation for mounting of the tie rod.

It can be advantageous if the accommodation for mounting of the lower spring link is disposed in the lower end region of the wheel mount.

It can be advantageous if the accommodation for mounting of the lower spring link is preferably configured in sleeve shape with a cylindrical passage bore. It can be advantageous if the cylindrical passage bore runs transversely to the cylindrical passage opening of the recess for accommodation of the kingpin.

It can be advantageous if at least one cutout introduced on one side is provided on the back side and/or front side of the wheel mount, in the region of the sleeve-shaped accommodation for mounting of the lower spring link.

It can be advantageous if the at least one cutout introduced on one side, on the back side and/or front side of the wheel mount, on the sleeve-shaped accommodation for mounting of the lower spring link, is surrounded, at least in part, by at least one reinforcement rib or bead and/or at least one reinforcement belt or ridge.

It can be advantageous if the accommodation for mounting of the lower wishbone is disposed in the lower end region of the wheel mount.

It can be advantageous if the accommodation for mounting of the lower wishbone, viewed in the direction of travel, is disposed ahead of the accommodation for mounting of the lower spring link.

It can be advantageous if the accommodation for mounting of the lower wishbone is preferably configured in sleeve shape with a cylindrical passage bore, wherein the cylindrical passage bore runs transversely to the cylindrical passage opening of the recess for accommodation of the kingpin and/or transversely to the cylindrical passage bore of the accommodation for mounting of the lower spring link. It can be advantageous if the entry region of the passage bore of the accommodation for mounting of the lower wishbone has a reinforced edge region.

It can be advantageous if the rear end region, viewed in the direction of travel, of the accommodation for mounting of the lower wishbone is connected with the accommodation for mounting of the lower spring link by way of at least one reinforcement wall.

It can be advantageous if the basic body has hollowed-out regions, recesses or cutouts, which are disposed around the recess for accommodation of the kingpin, at least in part, on one side, introduced preferably both from the front side and from the back side of the wheel mount.

It can be advantageous if in total, at least two, preferably three, particularly preferably four, very preferably five, very particularly preferably six, even more preferably seven, even yet more preferably eight, most preferably nine of the hollowed-out regions are alternately disposed.

Such a configuration particularly allows short flow paths when die-casting the wheel mount according to the invention.

It can be advantageous if two hollowed-out regions disposed alternately next to one another, in each instance, have a common intermediate wall, wherein the intermediate wall preferably comprises a wall thickness of 1 to 3 mm.

It can be advantageous if at least some of the intermediate walls disposed between the hollowed-out regions extend at least approximately radially outward, proceeding from the wall that surrounds the recess for accommodation of the kingpin.

It can be advantageous if the accommodations for connection of the brake caliper are disposed in the front end region of the wheel mount, viewed in the direction of travel, wherein the accommodations are essentially spaced apart vertically from one another and preferably are integrated into the wheel mount by way of a connection region that is approximately M-shaped in terms of its outer contour, but preferably planar for the remainder, wherein the accommodations are preferably disposed in the two front corner points of the M-shaped outer contour, viewed in the direction of travel.

It can be advantageous if the planar connection region is integrated into the wheel mount by way of a reinforcement wall that is preferably configured as a step. It can be advantageous if the reinforcement wall makes a transition into the front accommodation element, viewed in the direction of travel, of the accommodation for mounting of the upper wishbone fork.

It can be advantageous if the M-shaped outer contour is formed, at least in part, by at least one reinforcement rib or bead and/or wall or at least one reinforcement belt or ridge.

It can be advantageous if two reinforcement ribs, particularly running parallel, extend on the front side of the wheel mount, proceeding from each accommodation for connection of the brake caliper, in the direction of the recess for accommodation of the kingpin.

It can be advantageous if the two front reinforcement ribs, viewed in the direction of travel, come together by way of a common intermediate reinforcement rib, and the two rear reinforcement ribs, viewed in the direction of travel, come together, each on its own, in a node point disposed ahead of the recess for accommodation of the kingpin, viewed in the direction of travel.

It can be advantageous if the two front reinforcement ribs, i.e. those located on the outside, and the two reinforcement ribs that lie on the inside come together, each on its own, in a region disposed ahead of the recess for accommodation of the kingpin, viewed in the direction of travel.

It can be advantageous if at least one transverse strut disposed in the vertical direction is disposed between the two reinforcement ribs that lie on the outside, which strut preferably delimits a recess, particularly a triangular recess, which is preferably closed on one side.

It can be advantageous if the accommodation for positioning of the rpm sensor is disposed in a region of the wheel mount between the accommodation for accommodation of the kingpin and the accommodation of the upper wishbone fork.

It can be advantageous if the accommodation for attachment of the rpm sensor is disposed in a region of the wheel support between the accommodation for positioning of the rpm sensor and the accommodation of the upper wishbone fork.

It can be advantageous if the accommodation for attachment of the rpm sensor and/or the accommodation for positioning of the rpm sensor is disposed in a hollowed-out region introduced on one side on the back side of the wheel mount, wherein each recess is preferably delimited by at least one reinforcement rib.

It can be advantageous if the light metal is aluminum, an aluminum alloy and/or a magnesium alloy.

Figure 2:
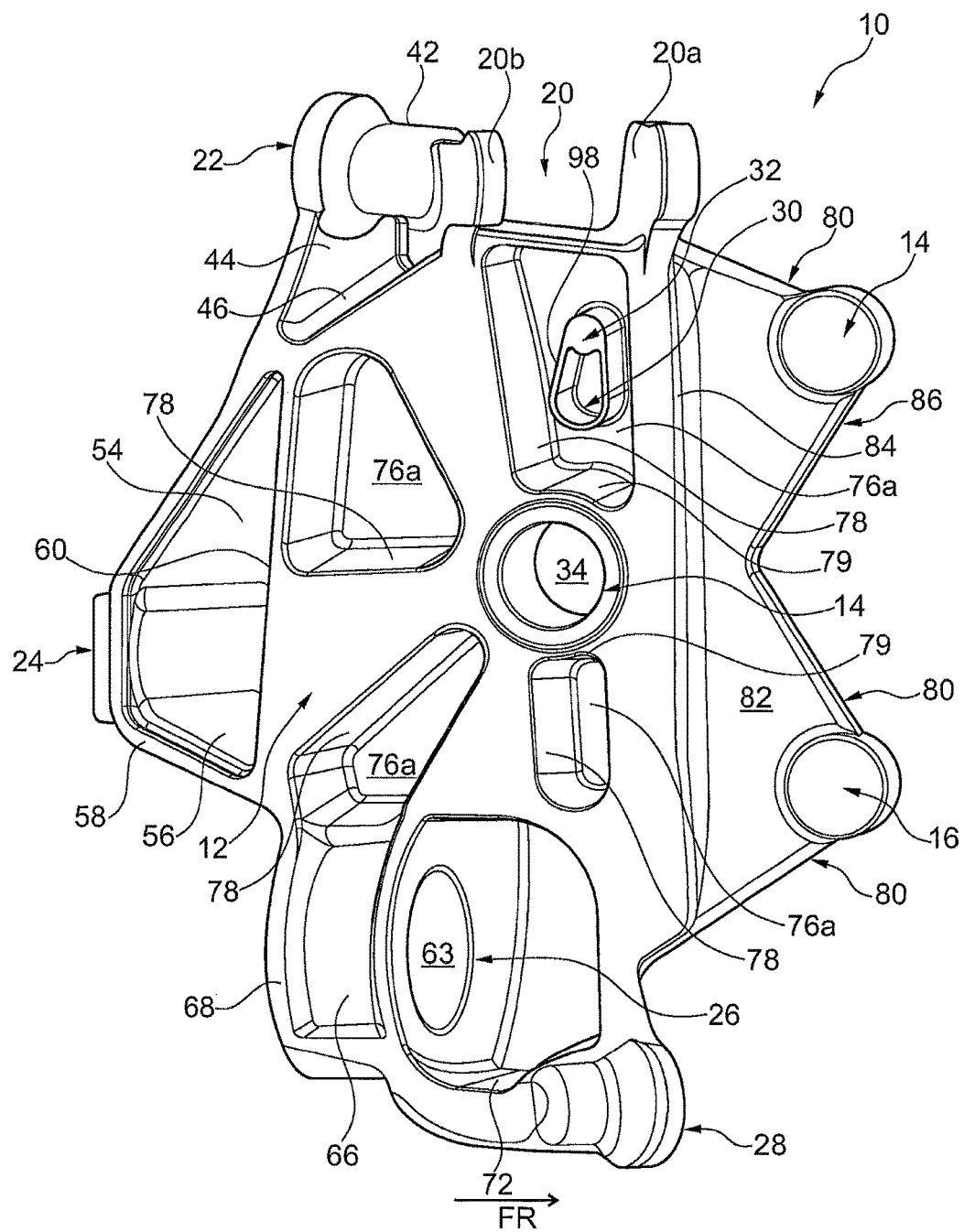
Figure 3:
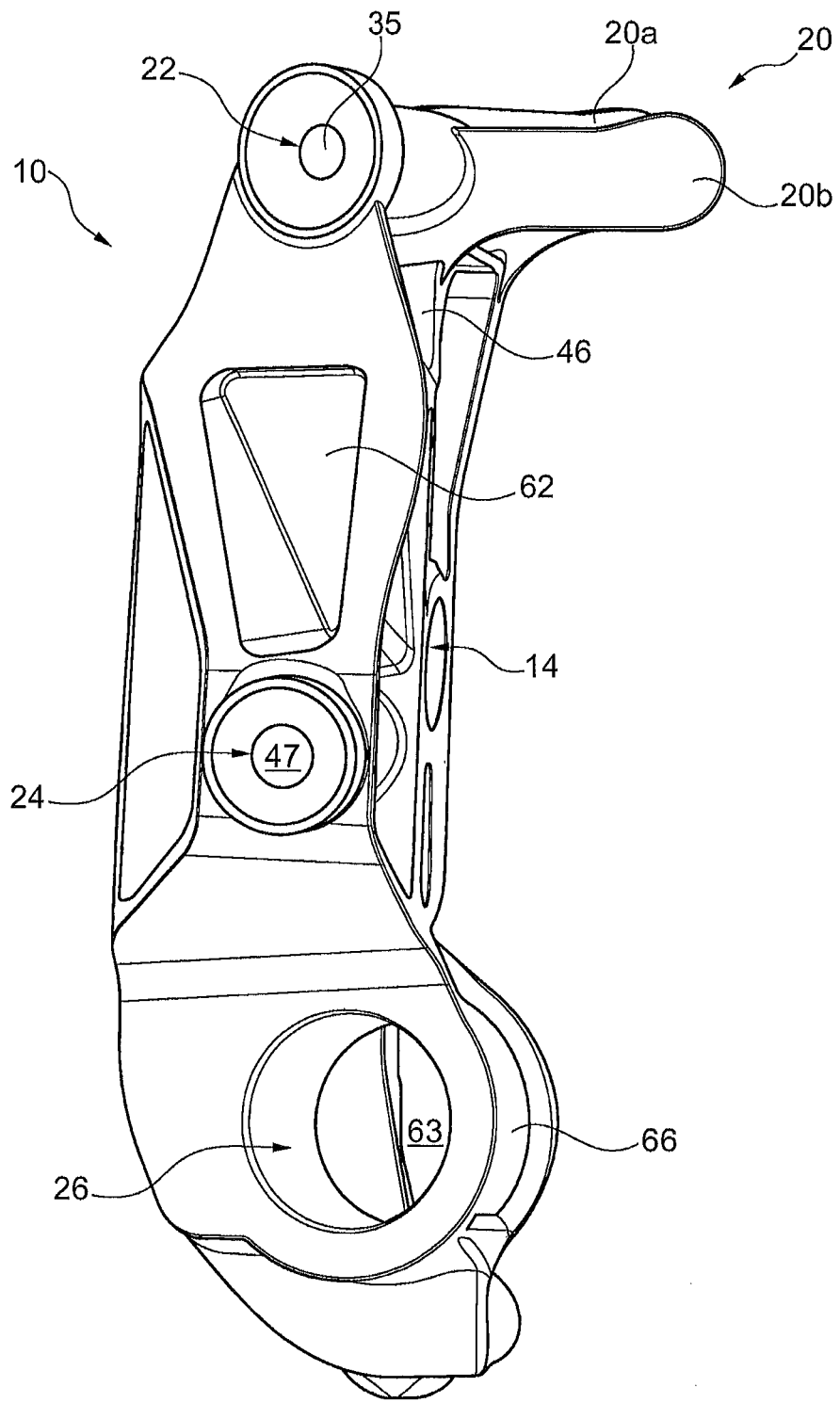
Figure 4:
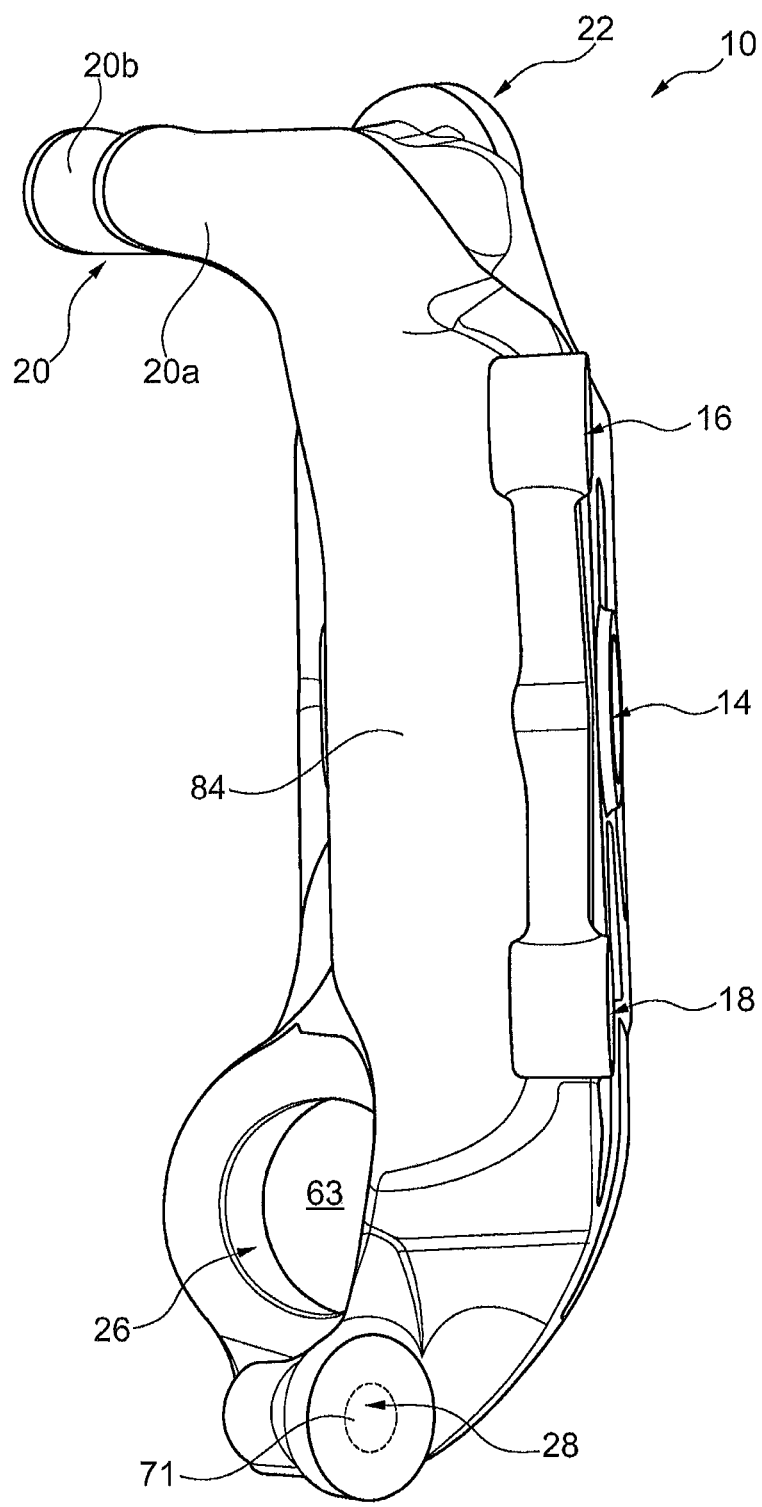
Figure 5:
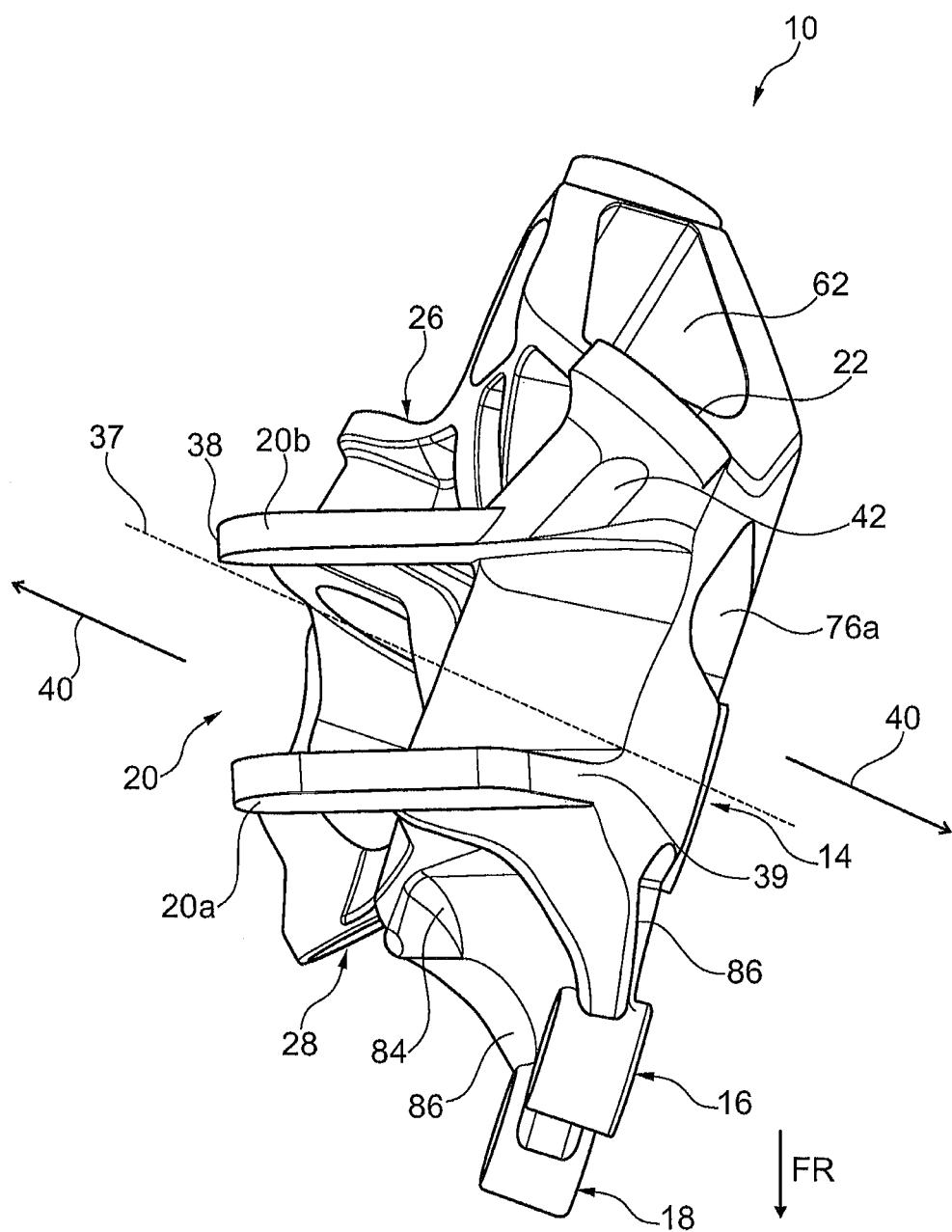
Figure 6:
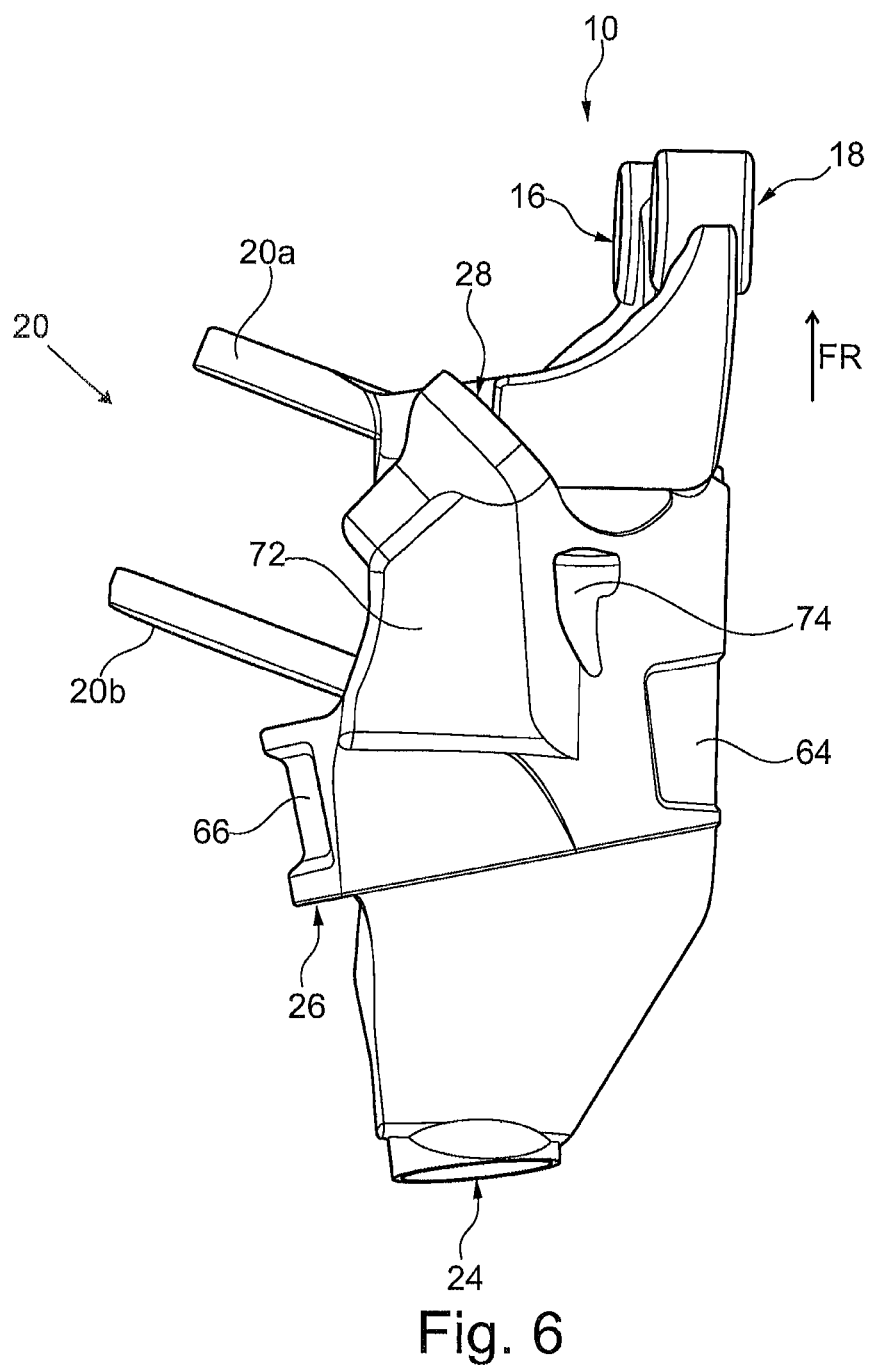
Figure 7:
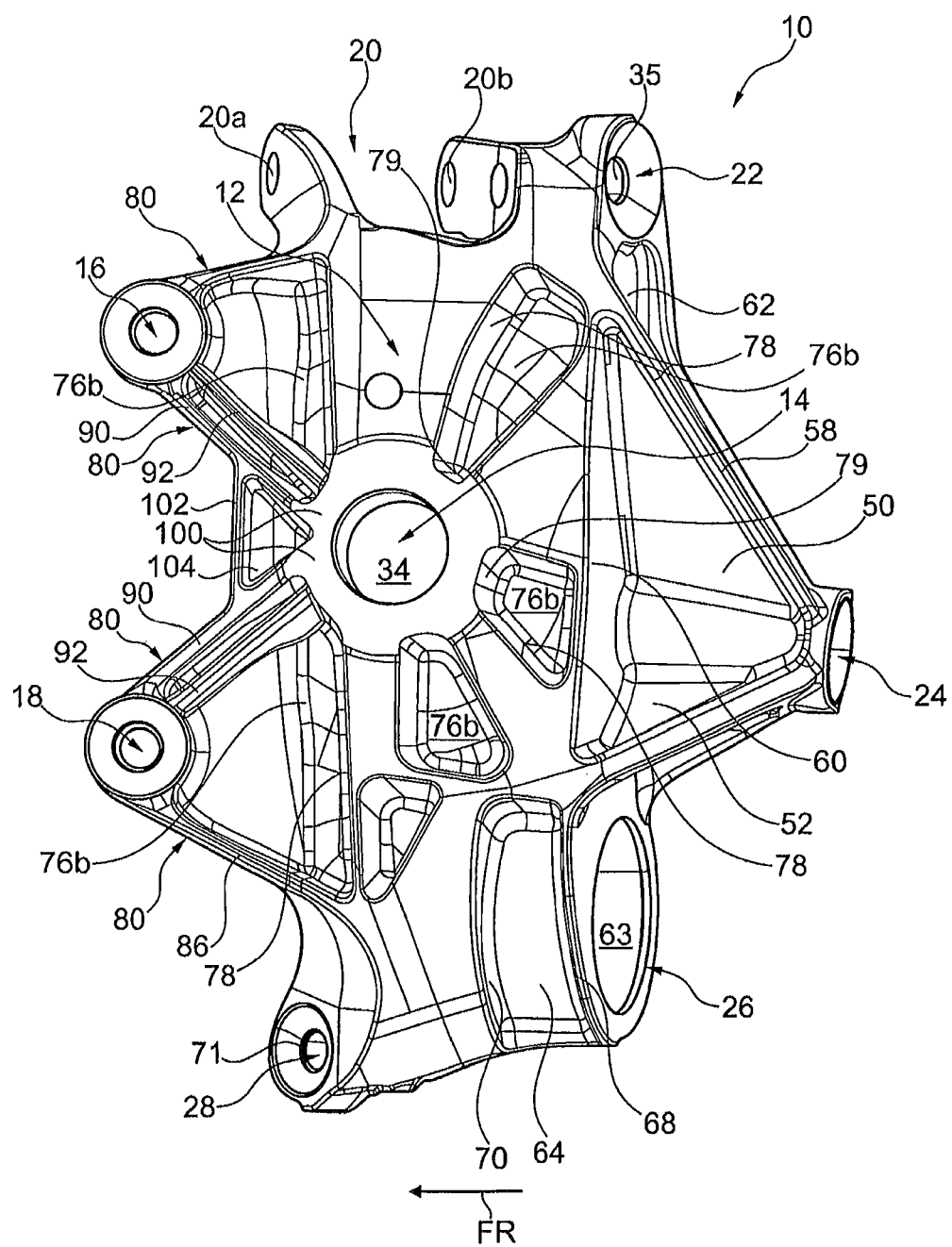
Figure 8:
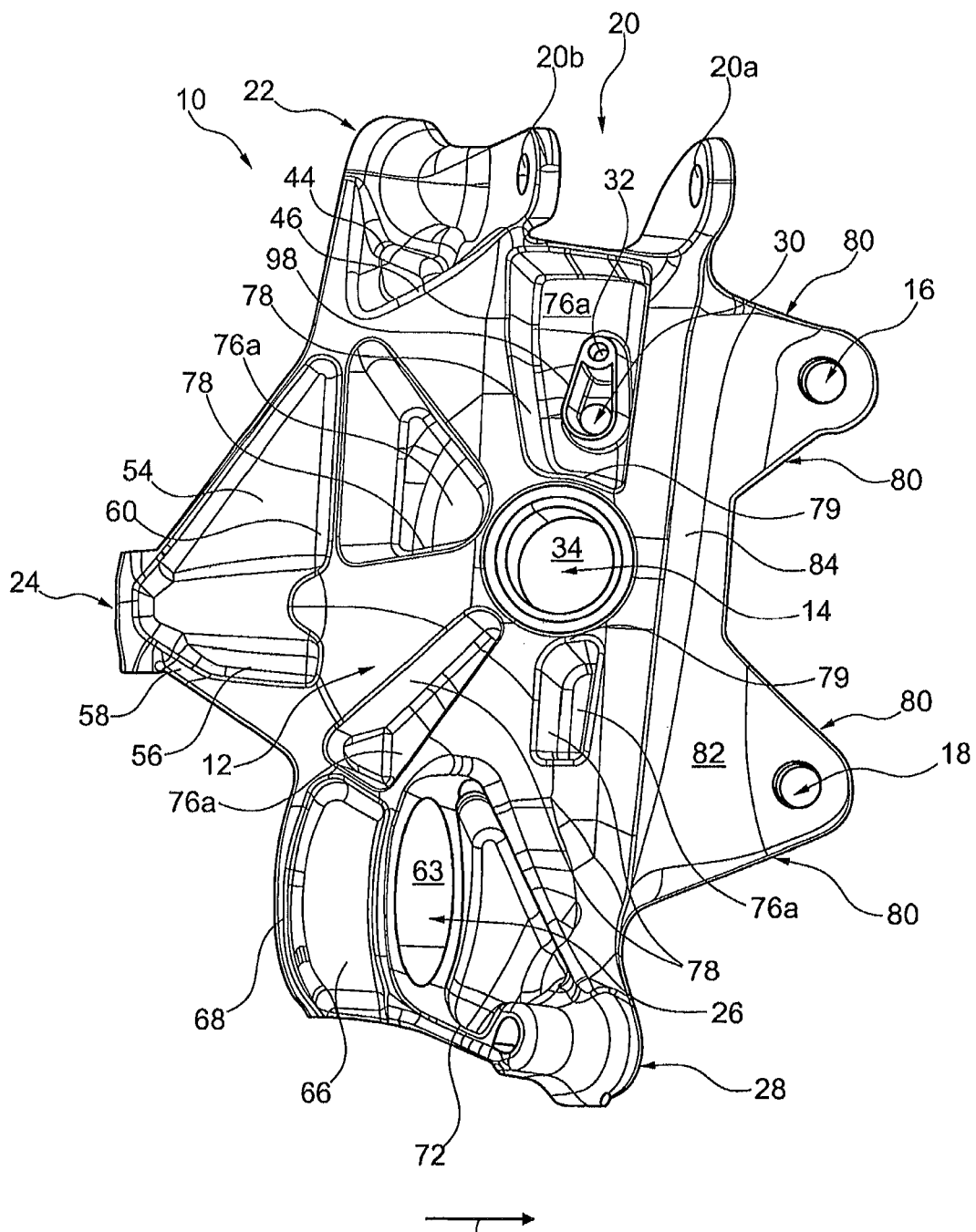

Further details of the invention can become evident from the following description of an exemplary embodiment in connection with the drawing. This shows:

FIG. 1 a perspective view of the die-cast wheel mount according to the invention in the predominantly non-machined state, with a view of the front side of the wheel mount, FIG. 2 a perspective view of the wheel mount according to the invention, according to FIG. 1, with a view of the back side of the wheel mount, FIG. 3 a perspective view of the wheel mount according to the invention, according to FIG. 1, with a view of the rear face side of the wheel mount, in the direction of travel, FIG. 4 a perspective view of the wheel mount according to the invention, according to FIG. 1, with a view of the front face side of the wheel mount, in the direction of travel, FIG. 5 a perspective view of the wheel mount according to the invention, according to FIG. 1, with a view of the upper face side of the wheel mount, FIG. 6 a perspective view of the wheel mount according to the invention, according to FIG. 1, with a view of the lower face side of the wheel mount, FIG. 7 a perspective view of a further die-cast wheel mount according to the invention, in the machined state, with a view of the front side of the wheel mount, and FIG. 8 a perspective view of the wheel mount according to the invention, according to FIG. 7, with a view of the back side of the wheel mount.

When the same reference symbols are used in FIGS. 1 to 8, these also refer to the same parts or regions.

When terms such as "at the top" and "at the bottom" are used in the following description or the claims, this is directional information proceeding from a position with a viewing direction from the outside, onto the wheel mount, in the installed state.

When terms such as "on the inside" and "on the outside" are used in the following description or the claims, what is meant is the side facing the inner wheel case wall (=inside, =back side) or the side facing away from the inner wheel case wall (=outside, =front side) of the wheel mount or the corresponding direction.

When terms such as "front" and "rear" are used in the following description, this is position information proceeding from a position with a viewing direction in the direction of travel, of the wheel mount in the installed state.

The wheel mount 10 shown in FIGS. 1 to 8 is the left embodiment of the wheel mount 10 according to the invention, viewed in the direction of travel FR of a motor vehicle. The right embodiment of the wheel mount 10, not shown here, is correspondingly configured as a mirror image.

The wheel mount according to the invention is produced from a light metal material, preferably an aluminum alloy, using the die-casting method, using at least one movable core and/or contoured part or slider.

The wheel mount 10 according to the invention, for the front axle of a motor vehicle, comprises a basic body 12 that has a recess 14 for accommodation of a kingpin for a wheel bearing, not shown here, two accommodations 16, 18 for connection of a brake caliper, not shown here, an accommodation 20 for mounting of an upper wishbone fork, not shown here, an accommodation 22 for mounting of an upper semi-trailing arm, not shown here, an accommodation 24 for mounting of a tie rod, not shown here, an accommodation 26 for mounting of a lower spring link, not shown here, an accommodation 28 for mounting of a lower wishbone, not shown here, an accommodation 30 for positioning of an rpm sensor, not shown here, and an accommodation 32 for attachment of the rpm sensor, not shown here, wherein the wheel mount 10 according to the invention is produced as a die-cast component made in one piece with these accommodations or recesses and connecting them with one another, preferably from light metal.

The recess 14 for accommodation of the kingpin, as the central element in the basic body 12, has a cylindrical passage opening 34 with an inside diameter that preferably remains the same over its length, which opening is essentially oriented horizontally.

The accommodation 20 for mounting of the upper wishbone fork is disposed in the upper end region of the wheel mount 10.

The accommodation 20 for mounting of the upper wishbone fork is configured approximately in U shape, with two accommodation elements 20a, 20b that are spaced apart from one another, viewed in the direction of travel FR, to surround and hold the upper wishbone fork.

The accommodation elements 20a, 20b are oriented at a slant in the direction of travel FR, with reference to the center longitudinal axis 36 of the cylindrical passage opening 34, as outriggers that project away from the back side of the wheel mount 10.

When viewing the upper face side of the wheel mount 10 according to FIG. 1, it becomes clear that the accommodation elements 20a, 20b are configured and oriented in such a manner that a mold division plane 37 of the die-cast wheel mount 10 is disposed between the accommodation elements 20a, 20b, parallel to the unmolding direction 40.

When viewing the upper face side of the wheel mount 10, the mold division plane 37, runs between the free end 38 of the rear accommodation element 20b, viewed in the direction of travel FR, and the non-free end 39 of the front accommodation element 20a, viewed in the direction of travel FR.

The accommodation 22 for mounting of the upper semi-trailing arm is disposed in the upper end region of the wheel mount 10.

The accommodation 22 for mounting of the upper semi-trailing arm is configured in sleeve shape, with a cylindrical passage bore 35, wherein the entry region of the passage bore 35 preferably has a reinforced edge region.

At least a part of the wall of the accommodation 22 for mounting of the upper semi-trailing arm makes a transition into the wall of the rear accommodation element. 20*b*, viewed in the direction of travel, of the accommodation 20 for mounting of the upper wishbone fork, preferably contributes to forming a part of the wall of the rear accommodation element 20*b*, viewed in the direction of travel FR.

A reinforcement rib 42 runs on the outside of the sleeve-shaped accommodation 22 for mounting of the upper semi-trailing arm and makes a transition into the wall of the rear accommodation element 20*b*, viewed in the direction of travel, of the accommodation 20 for mounting of the upper wishbone fork.

A cutout 44 introduced on one side is provided on the back side of the wheel mount 10, below the sleeve-shaped accommodation and directly following the sleeve-shaped accommodation 22 for mounting of the upper semi-trailing arm.

The cutout 44 that follows the sleeve-shaped accommodation 22 for mounting of an upper semi-trailing arm is delimited, at least in part, by a reinforcement wall 46 and/or reinforcement rib.

The accommodation 24 for mounting of the tie rod is disposed in the rear end region, viewed in the direction of travel, preferably at about half the height of the wheel mount 10.

The accommodation 24 for mounting of the tie rod is configured in sleeve shape, with a cylindrical passage bore 47, wherein the cylindrical passage bore 47 is preferably oriented in the direction of the recess 14 for accommodation of the kingpin and/or wherein the entry region of the passage bore 47 preferably has a reinforced edge region.

At least one cutout 50, 52, 54, 56 introduced on one side is provided on the back side and/or the front side of the wheel mount 10, along the one and/or the other side, in other words next to the sleeve-shaped accommodation 24 for mounting of the tie rod.

The cutouts 50, 52, 54, 56 introduced longitudinally next to the sleeve-shaped accommodation 24 for mounting of the tie rod are surrounded, each individually and/or as combined cutouts 50+52, 54+56, at least in part, by at least one reinforcement rib 58 and/or at least one reinforcement wall 60.

At least one hollowed-out region 62, recess or cutout is provided in the rear face side of the wheel mount 10, viewed in the direction of travel.

The hollowed-out region 62, recess or cutout provided in the rear face side of the wheel mount 10, viewed in the direction of travel, is introduced on one side during die-casting, using a movable core and/or contoured part or slider.

The hollowed-out region 62, recess or cutout provided in the rear face side of the wheel mount 10, viewed in the direction of travel FR, is disposed between the accommodation 22 for mounting of the upper semi-trailing arm and the accommodation 42 for mounting of the tie rod.

The accommodation 26 for mounting of the lower spring link is disposed in the lower end region of the wheel mount 10.

The accommodation 26 for mounting of the lower spring link is configured in sleeve shape with a cylindrical passage bore 63, wherein the cylindrical passage bore 63 runs transversely to the cylindrical passage opening 34 of the recess 14 for accommodation of the kingpin.

At least one cutout 64, 66 introduced on one side is provided on the back side and/or front side of the wheel mount 10, on the sleeve-shaped accommodation 26 for mounting of the lower spring link.

The at least one cutout 64, 66 introduced on one side, on the back side and/or front side of the wheel mount 10, on the sleeve-shaped accommodation 26 for mounting of the lower spring link, is surrounded, at least in part, by at least one reinforcement rib 68 and/or at least one reinforcement wall 70.

The accommodation 28 for mounting of the lower wishbone is disposed in the lower end region of the wheel mount 10.

The accommodation 28 for mounting of the lower wishbone, viewed in the direction of travel FR, is disposed ahead of the accommodation 26 for mounting of the lower spring link.

The accommodation 28 for mounting of the lower wishbone is configured in sleeve shape with a cylindrical passage bore 71, wherein the cylindrical passage bore 71 runs transversely to the cylindrical passage opening 34 of the recess 14 for accommodation of the kingpin and transversely to the cylindrical passage bore 63 of the accommodation 26 for mounting of the lower spring link, wherein the entry region of the passage bore 71 preferably has a reinforced edge region.

The rear end region, viewed in the direction of travel FR, of the accommodation 28 for mounting of the lower wishbone is connected with the accommodation 26 for mounting of the lower spring link by way of at least one reinforcement wall 72. It is advantageous if a cutout introduced on one side is provided within the reinforcement wall 72.

The basic body 12 has hollowed-out regions 76*a*, 76*b*, recesses or cutouts, which are disposed around the recess 14 for accommodation of the kingpin, at least in part, on one side, introduced preferably both from the front side and from the back side of the wheel mount 10.

In total, at least two, preferably three, particularly preferably four, very preferably five, very particularly preferably six, even more preferably seven, even yet more preferably eight, most preferably nine of the hollowed-out regions 76*a*, 76*b* are alternately disposed.

Two hollowed-out regions 76*a*, 76*b* disposed alternately next to one another, in each instance, have a common intermediate wall, wherein the intermediate wall preferably comprises a wall thickness of 1 to 3 mm.

At least some of the intermediate walls 78 disposed between the hollowed-out regions 76*a*, 76*b* extend at least approximately radially outward, proceeding from the wall 79 that surrounds the recess 14 for accommodation of the kingpin.

The accommodations 16, 18 for connection of the brake caliper are disposed in the front end region of the wheel mount 10, viewed in the direction of travel FR, wherein the accommodations 16, 18 are essentially spaced apart vertically from one another and preferably are integrated into the wheel mount 10 by way of a connection region 82 that is approximately M-shaped in terms of its outer contour, but preferably planar for the remainder, wherein the accommodations 16, 18 are preferably disposed in the two front corner points of the M-shaped outer contour 80, viewed in the direction of travel FR. Since the wheel mount 10 shown in FIGS. 1-6 is essentially shown in the untreated state, the accommodation bores that belong to the accommodations 16, 18 are not yet reproduced.

The planar connection region 80 is integrated into the wheel mount 10 by way of a reinforcement wall 84 that is preferably configured as a step.

The M-shaped outer contour 80 is formed, at least in part, by at least one reinforcement rib 86 and/or one reinforcement wall.

Two reinforcement ribs 90, 92, particularly running parallel, extend on the front side of the wheel mount 10, proceeding from each accommodation 16, 18 for connection of the brake caliper, in the direction of the recess 14 for accommodation of the kingpin, wherein the two reinforcement ribs 90 that lie on the outside come together by way of a common intermediate reinforcement rib 94, and the two reinforcement ribs 92 that lie on the inside come together, each on its own, in a node point 96 disposed ahead of the recess 14 for accommodation of the kingpin, viewed in the direction of travel FR.

Two reinforcement ribs 90, 92, particularly running parallel, extend on the front side of the wheel mount 10 shown in FIGS. 7 and 8, proceeding from each accommodation 16, 18 for connection of the brake caliper, in the direction of the recess 14 for accommodation of the kingpin, wherein the two reinforcement ribs 90 that lie on the outside and the two reinforcement ribs 92 that lie on the inside come together, in contrast, each on its own, in a region 100 disposed ahead of the recess 14 for accommodation of the kingpin, viewed in the direction of travel FR. A transverse strut 102 disposed in the vertical direction is disposed between the two reinforcement ribs 90 that lie on the outside, which strut preferably delimits a recess 104, particularly a triangular recess, which is preferably closed on one side.

The accommodation 30 for positioning of the rpm sensor is disposed in a region of the wheel mount 10 between the accommodation 14 for accommodation of the kingpin and the accommodation 20 of the upper wishbone fork.

The accommodation 32 for attachment of the rpm sensor is disposed in a region of the wheel support 10 between the accommodation 30 for positioning of the rpm sensor and the accommodation 20 of the upper wishbone fork. Since the wheel mount 10 shown in FIG. 1 is shown essentially in the untreated state, the accommodation bore or attachment bore that belongs to the accommodation 32 is not yet reproduced.

The accommodation 32 for attachment of the rpm sensor and/or the accommodation 30 for positioning of the rpm sensor are disposed in a hollowed-out region 74a introduced on one side on the back side of the wheel mount 10, wherein each recess 32, 30 is preferably delimited by at least one reinforcement rib 98.

The light metal is aluminum, an aluminum alloy and/or a magnesium alloy.

REFERENCE SYMBOL LIST (is part of the specification)
10 wheel mount
12 basic body
14 recess for accommodation of a kingpin for a wheel bearing
16 accommodation for connection of a brake caliper
18 accommodation for connection of a brake caliper
20 accommodation for mounting of an upper wishbone fork
20a accommodation element
20b accommodation element
22 accommodation for mounting of an upper semi-trailing arm
24 accommodation for mounting of a tie rod
26 accommodation for mounting of a lower spring link
28 accommodation for mounting of a lower wishbone
30 accommodation for mounting of an upper semi-trailing arm
32 accommodation for attachment of a sensor, particularly an rpm sensor
34 cylindrical passage bore at 14
35 cylindrical passage bore at 22
36 center longitudinal axis
37 mold division plane
38 free end of the accommodation element 20b
39 non-free end of the accommodation element 20a
40 unmolding direction
42 reinforcement rib
44 cutout
46 reinforcement wall
47 passage bore at 24
50 cutout
52 cutout
54 cutout
56 cutout
58 reinforcement rib
60 reinforcement wall
62 hollowed-out region
63 passage bore at 26
64 cutout
66 cutout
68 reinforcement rib
70 reinforcement wall
71 passage bore at 28
72 reinforcement wall
74 cutout
76a hollowed-out region (back side)
76b hollowed-Out region (front side)
78 intermediate wall
79 surrounding wall of 14
80 M-shaped outer contour
82 planar connection region
84 reinforcement wall (step)
86 reinforcement rib (M contour)
90 reinforcement rib (M contour) on the outside
92 reinforcement rib on the inside
94 intermediate reinforcement rib
96 node point
98 reinforcement rib around 30, 32
100 region
102 transverse strut
104 recess
FR direction of travel

The invention claimed is:

1. A wheel mount having a basic body that has at least individual ones of the accommodations or recesses listed below:
for accommodation of a kingpin for a wheel bearing,
for connection of a brake caliper,
for mounting of an upper wishbone fork,
for mounting of an upper semi-trailing arm,
for mounting of a tie rod,
for mounting of a lower spring link,
for mounting of a further lower wishbone,
for positioning of an rpm sensor,
for attachment of an rpm sensor,
wherein the wheel mount is produced as a die-cast component made in one piece with these accommodations or recesses and connecting them with one another, from light metal.

2. The wheel mount according to claim 1, wherein the accommodation for accommodation of the kingpin, as the central element in the basic body, has a cylindrical passage opening with an inside diameter that remains the same over its length, which opening is essentially oriented horizontally.

3. The wheel mount according to claim 2, wherein the accommodation for mounting of the upper wishbone fork is configured approximately in U shape, with front and rear accommodation elements that are spaced apart from one another, viewed in the direction of travel, to surround and hold the upper wishbone fork.

4. The wheel mount according to claim 3, wherein the front and rear accommodation elements are oriented at a slant in the direction of travel, with reference to the center longitudinal axis of the cylindrical passage opening, as outriggers that project away from the back side of the wheel mount.

5. The wheel mount according to claim 3, wherein the front and rear accommodation elements are configured and oriented, when viewing the upper face side of the wheel mount, in such a manner that a mold division plane of the die-cast wheel mount is disposed between the front and rear accommodation elements, parallel to an unmolding direction.

6. The wheel mount according to claim 3, wherein a mold division plane, when viewing the upper face side of the wheel mount, runs between the free end of the rear accommodation element, viewed in the direction of travel, and the non-free end of the front accommodation element, viewed in the direction of travel.

7. The wheel mount according to claim 3, wherein the accommodation for mounting of the upper semi-trailing arm is a sleeve-shaped accommodation configured in sleeve shape, with a cylindrical passage bore, wherein the entry region of the passage bore (35) has a reinforced edge region.

8. The wheel mount according to claim 7, wherein a reinforcement rib runs on the outside of the sleeve-shaped accommodation and makes a transition into the wall of the rear accommodation element, viewed in the direction of travel, of the accommodation for mounting of the upper wishbone fork.

9. The wheel mount according to claim 7, wherein a cutout introduced on one side is provided on the back side of the wheel mount, below and directly following the sleeve-shaped accommodation for mounting of the upper semi-trailing arm.

10. The wheel mount according to claim 9, wherein the cutout that follows the sleeve-shaped accommodation for mounting of an upper semi-trailing arm is delimited, at least in part, by a reinforcement wall and/or reinforcement rib.

11. The wheel mount according to claim 3, wherein at least a part of the wall of the accommodation for mounting of the upper semi-trailing arm makes a transition into the wall of the rear accommodation element, viewed in the direction of travel, of the accommodation for mounting of the upper wishbone fork.

12. The wheel mount according to claim 2, wherein the accommodation for mounting of the lower spring link is a sleeve-shaped lower spring link accommodation configured in sleeve shape with a cylindrical passage lower spring link accommodation bore, wherein the cylindrical passage lower spring link accommodation bore runs transversely to the cylindrical passage opening of the accommodation for accommodation of the kingpin.

13. The wheel mount according to claim 12, wherein at least one cutout introduced on one side is provided on the back side and/or front side of the wheel mount, on the sleeve-shaped lower spring link accommodation for mounting of the lower spring link.

14. The wheel mount according to claim 13, wherein the at least one cutout introduced on one side, on the back side and/or front side of the wheel mount, on the sleeve-shaped lower spring accommodation for mounting of the lower spring link, is surrounded, at least in part, by at least one reinforcement rib and/or at least one reinforcement wall.

15. The wheel mount according to claim 12, wherein the accommodation for mounting of the lower wishbone is configured in sleeve shape with a cylindrical passage lower wishbone accommodation bore, wherein the cylindrical passage lower wishbone accommodation bore runs transversely to the cylindrical passage opening of the accommodation for accommodation of the kingpin and transversely to the cylindrical passage lower spring link accommodation bore of the accommodation for mounting of the lower spring link, wherein the entry region of the cylindrical passage lower wishbone accommodation bore preferably has a reinforced edge region.

16. The wheel mount according to claim 1, wherein the accommodation for mounting of the upper wishbone fork is disposed in the upper end region of the wheel mount.

17. The wheel mount according to claim 1, wherein the accommodation for mounting of the upper semi-trailing arm is disposed in the upper end region of the wheel mount.

18. The wheel mount according to claim 1, wherein the accommodation for mounting of the tie rod is disposed in the rear end region, viewed in the direction of travel.

19. The wheel mount according to claim 1, wherein the accommodation for mounting of the tie rod is configured in sleeve shape, with a cylindrical passage bore, wherein the cylindrical passage bore is oriented in the direction of the accommodation for accommodation of the kingpin and/or wherein the entry region of the passage bore has a reinforced edge region.

20. The wheel mount according to claim 1, wherein at least one hollowed-out region, recess or cutout is provided in the rear face side of the wheel mount, viewed in the direction of travel.

21. The wheel mount according to claim 20, wherein the at least one hollowed-out region, recess or cutout provided in the rear face side of the wheel mount, viewed in the direction of travel, is introduced on one side during die-casting, using a movable core and/or contoured part or slider.

22. The wheel mount according to claim 20, wherein the at least one hollowed-out region, recess or cutout provided in the rear face side of the wheel mount, viewed in the direction of travel, is disposed between the accommodation for mounting of the upper semi-trailing arm and the accommodation for mounting of the tie rod.

23. The wheel mount according to claim 1, wherein the accommodation for mounting of the lower spring link is disposed in the lower end region of the wheel mount.

24. The wheel mount according to claim 1, wherein the accommodation for mounting of the lower wishbone is disposed in the lower end region of the wheel mount.

25. The wheel mount according to claim 1, wherein the accommodation for mounting of the lower wishbone, viewed in the direction of travel, is disposed ahead of the accommodation for mounting of the lower spring link.

26. The wheel mount according to claim 1, wherein the rear end region, viewed in the direction of travel, of the accommodation for mounting of the lower wishbone is connected with the accommodation for mounting of the lower spring link by way of at least one reinforcement wall.

27. The wheel mount according to claim 1, wherein the basic body has hollowed-out regions, recesses or cutouts, which are disposed around the accommodation for accommodation of the kingpin, at least in part, on one side, introduced both from the front side and from the back side of the wheel mount.

28. The wheel mount according to claim 27, wherein in total, at least two of the hollowed-out regions are alternately disposed.

29. The wheel mount according to claim 1, wherein the accommodations for connection of the brake caliper are disposed in the front end region of the wheel mount, viewed in the direction of travel, wherein the accommodations are essentially spaced apart vertically from one another and are integrated into the wheel mount by way of a connection region that is approximately M-shaped in terms of its outer contour, but planar for the remainder, wherein the accommodations are disposed in the two front corner points of the M-shaped outer contour, viewed in the direction of travel.

30. The wheel mount according to claim 29, wherein the connection region is integrated into the wheel mount by way of a reinforcement wall that is configured as a step.

31. The wheel mount according to claim 29, wherein the M-shaped outer contour is formed, at least in part, by at least one reinforcement rib and/or one reinforcement wall.

32. The wheel mount according to claim 1, wherein the accommodation for positioning of the rpm sensor is disposed in a region of the wheel mount between the accommodation for accommodation of the kingpin and the accommodation of the upper wishbone fork.

33. The wheel mount according to claim 1, wherein the accommodation for attachment of the rpm sensor is disposed in a region of the wheel support between the accommodation for positioning of the rpm sensor and the accommodation of the upper wishbone fork.

34. The wheel mount according to claim 1, wherein the accommodation for attachment of the rpm sensor and/or the accommodation for positioning of the rpm sensor is disposed in a hollowed-out region introduced on one side on the back side of the wheel mount.

35. The wheel mount according to claim 1, wherein the light metal is aluminum, an aluminum alloy and/or a magnesium alloy.

* * * * *